United States Patent Office 3,119,655
Patented Jan. 28, 1964

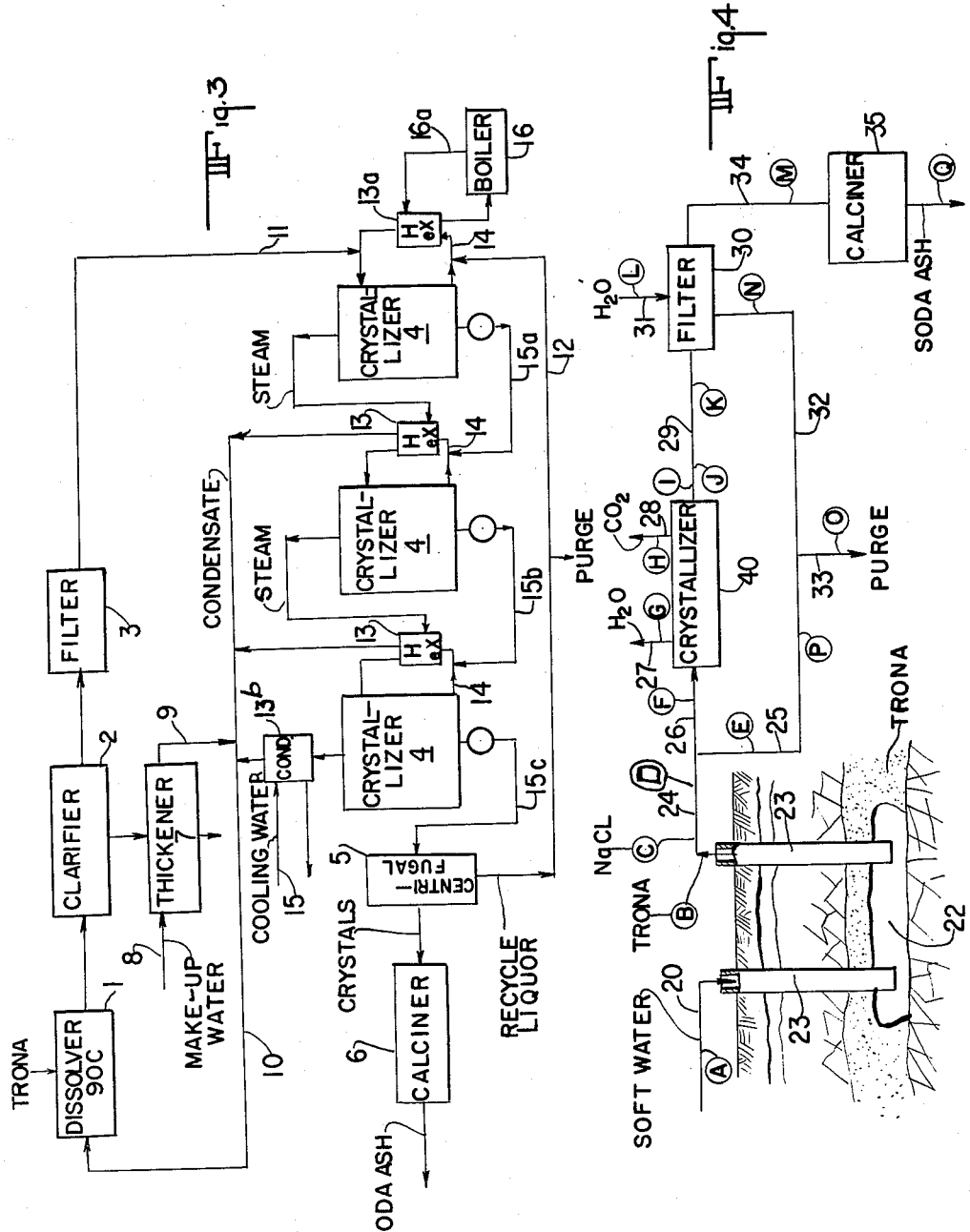

3,119,655
EVAPORATIVE PROCESS FOR PRODUCING
SODA ASH FROM TRONA
William R. Frint, Green River, Wyo., and Allen P. McCue, Norwalk, Conn., assignors to FMC Corporation, a corporation of Delaware
Filed Feb. 17, 1961, Ser. No. 90,109
11 Claims. (Cl. 23—63)

This invention relates to an improved process for producing soda ash from trona as found in Wyoming and similar deposits found in other parts of the world.

The trona deposits in southwestern Wyoming are found at a depth of 1200 to 1800 feet underground and consist of a main trona bed varying in thickness from about 8 feet to about 18 feet and other beds of smaller thickness. The trona consists mainly of sodium sesquicarbonate ($Na_2CO_3 \cdot NaHCO_3 \cdot 2H_2O$) and 4% to 6% insoluble impurities. A typical analysis of the crude trona is—

|  | Percent |
|---|---|
| $Na_2CO_3$ | 45.0 |
| $NaHCO_3$ | 36.0 |
| $H_2O$ | 15.3 |
| NaCl | 0.04 |
| $Na_2SO_4$ | 0.01 |
| Total iron | 0.08 |
| Water insoluble | 3.6 |

The composition of the crude trona corresponds quite closely to that of pure sodium sesquicarbonate except for the impurities present. The trona is associated with shale stringers or beds which alter the amount of the impurities in different parts of the bed.

The process of this invention comprises dissolving the trona in water, separating the insoluble matter and recrystallizing the pure sodium sesquicarbonate from a solution maintained at a composition in which sodium sesquicarbonate is the stable phase.

The process is applicable either to dry mined trona which is brought to the surface, crushed and dissolved in water, or to solution mined trona which is produced by circulating water through the underground trona deposits by means of wells and the solution brought to the surface and processed as herein described.

One of the objects of the invention is to recover and purify crude trona by the novel method herein described whereby pure soda ash can be produced with a minimum capital and processing expense.

Another object of the invention is to purify crude trona by a novel process in which large amounts of mother liquor do not have to be recycled through the entire process thereby reducing the equipment needed and effecting a saving in material costs.

Another object of the invention is to provide a process of producing soda ash or sodium sesquicarbonate having greater purity and better particle size characteristics than the commercial processes heretofore used.

These and other objects and advantages of the invention will be apparent from the following description.

In the accompanying drawings—

FIG. 1 illustrates part of the solubility diagram for the constituents of sodium sesquicarbonate and water heretofore referred to.

FIG. 3 is a diagrammatical flow sheet illustrating the operation of the process for the production of soda ash from dry mined trona, and FIG. 4 is a diagrammatical flow sheet illustrating the operation of the process for the production of soda ash from solution mined trona.

Sodium sesquicarbonate or trona is an incongruently dissolving double salt, that is, when dissolved in water, the sodium sesquicarbonate is not in equilibrium with the water and attempted crystallization results in the production of a different salt, in this case, sodium bicarbonate. Therefore, when crude trona is dissolved in hot water, sodium sesquicarbonate cannot be crystallized from solution by cooling.

Figure 1:
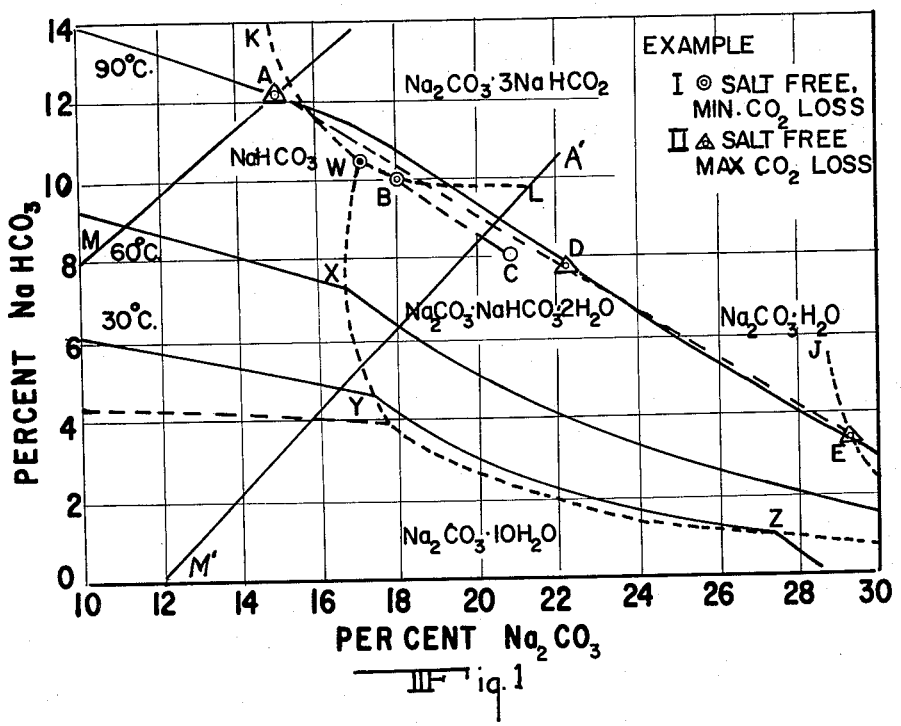
Figure 2:
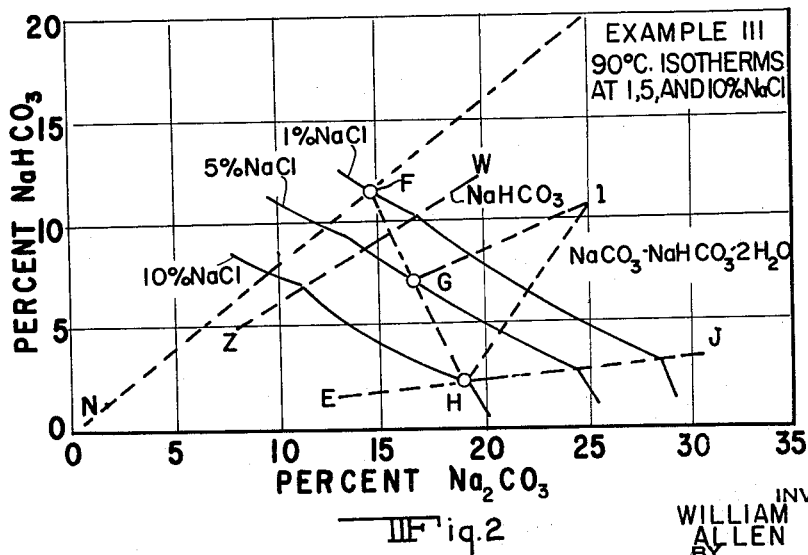
FIG. 2 illustrates the solubility diagram for the constituents of sodium sesquicarbonate and water when sodium chloride is present in the system.

This is illustrated by FIGS. 1 and 2 which represent the phase and solubility relationships of the constituents of sodium sesquicarbonate. FIG. 1 shows three temperature isotherms of 90° C., 60° C. and 30° C. when no NaCl is present in the solution, while FIG. 2 shows the 90° C. temperature isotherm with various amounts of NaCl present in the system.

The line AM in FIG. 1 and the line FN in FIG. 2 represent the composition of the solution when sodium sesquicarbonate is dissolved in water, the actual composition of which is dependent on the temperature. In FIG. 1, the point A indicates the composition of an impurity free sodium sesquicarbonate solution saturated at 90° C. The line passing through points W, X, Y and Z meets the line passing through points J and E at a point off the graph, and the area included between these lines is the region wherein sodium sesquicarbonate crystals are in equilibrium with the solution, and it is only within this area that sodium sesquicarbonate can be crystallized from solution. The area will be named herein for convenience as area WZEJ. Since the point A does not fall within the area WZEJ, it is seen that sodium sesquicarbonate cannot be dissolved in hot water and crystallized when the solution is cooled, or evaporated. The line KWBL represents the boundary between the Wegscheider salt ($NaCO_3 \cdot 3NaHCO_3$) region and the sodium bicarbonate and sodium sesquicarbonate regions separated by the line W, X, Y.

FIG. 2 shows the 90° C. isotherms for sodium sesquicarbonate solutions containing 1%, 5% and 10% sodium chloride. When trona is solution mined, the solutions from the exit wells contain on the order of 1% sodium chloride by weight based on the total solution, and are presented by point F. The area between lines WZ and EJ and the 1 and 10% NaCl lines is the area within which sodium sesquicarbonate will crystallize from a solution containing sodium chloride. Since point F is outside the area WZEJ, sodium sesquicarbonate cannot be directly crystallized from the trona solution obtained by solution mining.

The prior art method of recovering sodium sesquicarbonate crystals from dissolved trona is exemplified by U.S. Patent No. 2,346,140, granted to Robert D. Pike.

The Pike process consists of a cyclic system in which the crude trona is dissolved in a hot aqueous solution containing additional sodium carbonate over and above the mol ratio of sodium carbonate to sodium bicarbonate usually present in sodium sesquicarbonate. By so doing, the trona dissolving line AM in FIG. 1 is shifted to the right into the area WZEJ, and upon cooling such a solution sodium sesquicarbonate crystallizes out. Line A'M' of FIG. 1 illustrates such a dissolving-crystallizing path.

The disadvantage of the Pike process is the large amount of mother liquor necessary to be recycled through the plant to produce a solvent carrier of the proper composition, so that the crystallization step will occur within the area WZEJ. In such a recirculation system as described in said Patent No. 2,346,140, 1000 gallons of hot saturated solution from the dissolver having dissolved therein sodium carbonate salts equivalent to 2500 or more pounds of sodium carbonate will yield only the equivalent of 900 pounds of sodium carbonate when processed. It is apparent, therefore, that the majority of the sodium carbonate values remain in the mother liquor and are recycled around and around the plant. For example, the production of one million tons of soda ash per year by the process of said patent requires the processing of approximately seven million gallons of liquor per day. The handling and processing of such a large quantity of mother liquor requires very large and expensive equipment. Also, the cost of materials, such as filter aid, adsorbent, crystallizing agent, etc., required to treat the large quantities of mother liquor adds greatly to the production cost.

The process of the present invention greatly reduces the quantity of solution which it is necessary to handle in order to obtain a given amount of soda ash. These desirable results are obtained by dissolving the crude trona in water and so controlling the composition of the solution at the crystallization step as to yield pure sodium sesquicarbonate crystals which can be sold as such or which can be calcined to produce a high purity soda ash of very desirable physical properties. The crystallization step is accomplished by maintaining in the crystallizing liquor a small but sufficient quantity of sodium carbonate in excess of that obtained from dissolving the trona to cause the crystallization of sodium sesquicarbonate from the solution. The instant process will yield 2,200 to 2,400 pounds of sodium carbonate (or 3,200 pounds of sodium sesquicarbonate) per 1,000 gallons of crude trona solution produced in the dissolving step.

In accordance with the embodiment of the process illustrated in FIG. 3, the crude mined trona is contacted with hot water in an insulated dissolver 1. The dissolver 1 can be simply constructed and small in size as compared with the size of dissolvers necessary when the same quantity of crude trona is dissolved in a recycling mother liquor, as trona has a much faster dissolving rate in water than in a recycled mother liquor already carrying substantial amounts of sodium salts dissolved therein. The liquor from the dissolver is saturated near the boiling point of water, i.e., 90° to 95° C. and is represented by point A in FIG. 1. The solution contains approximately one-third dissolved trona by weight. By dissolving in hotter water under pressure, a higher degree of saturation can be obtained, for example, solutions saturated up to 150° C. are possible. The solution is clarified, preferably in a settling type clarifier 2, and the clarified overflow run through filter 3 to remove any residual insoluble material. If desired, an adsorbent, such as activated carbon, may be added to the solution prior to filtration. The mud formed from the insoluble material which settles out of clarifier 2 goes to a thickener 7 where it is washed with makeup water from the line 8 to recover residual trona values therein. The overflow from the settler 7 flows through line 9 into the condensate line 10 going to the dissolver 1, and the insoluble muds are discarded to waste. The clarified solution from the filter 3 is then sent through line 11 to the crystallizers 4 where it is mixed with the recycled mother liquor returning through line 12 from the centrifugals 5.

Although one crystallizer may be used, multiple effect crystallizers 4 are preferred because of the savings from the improved fuel efficiency. In the crystallizers 4 the amount of water evaporated is equivalent to that added to the dissolver 1. The effluent of the last stage crystallizer is a transferable crystal slurry which is pumped to a filter or centrifuge 5 where the crystals are separated from the mother liquor. The crystals then may be dried and sold as sodium sesquicarbonate or transferred to the calciner 6 to be calcined to soda ash and the mother liquor is returned through the line 12 to the first effect crystallizer.

The water evaporated can be condensed in the heat exchangers 13 and recycled with makeup water from the thickener 7 as the water to dissolve the crude trona. The makeup water, prepared by running raw water through thickener 7 which contains the sludge from the clarifier 2, is softened in the process. Raw river water having an average hardness of about 270 p.p.m., calculated as calcium carbonate, in contact with the trona insolubles and associated liquor from clarifier 2, is softened to a hardness of about 50 to 60 p.p.m., calculated as calcium carbonate in the thickener 7 and the calcium is automatically precipitated and discarded with the insoluble muds and at the same time the residual sodium values in the trona muds are recovered. By providing softened makeup water for the process in this way and using the condensate from the heat exchangers 13, scaling of equipment is greatly reduced.

The recycled mother liquor from the centrifugal 5 contains excess sodium carbonate sufficient, that when it is added to the incoming trona-water solution from line 11, the overall composition of the solution falls within the WZEJ area in FIG. 1 so that only sodium sesquicarbonate is crystallized out in crystallizers 4.

During the operation of the crystallizers 4 a crystal slurry is preferably continuously pumped through the lines 14 from the bottom of each crystallizer, through the indirect heat exchangers 13 and into the top of each crystallizer 4. The difference in temperature between the different crystallizers 4 is such that the steam from the preceding crystallizer is condensed and the recycle stream from each crystallizer heated except for the last crystallizer where cooling water from the line 15 is used to condense the steam in the condenser 13b. Additional heat may be provided in the heat exchanger 13a for the first crystallizer 4 by the boiler 16 and steam line 16a. The net flow of crystal slurry from each crystallizer to the next in the series and finally to the centrifuges 5 is controlled by pumps in lines 15a, 15b and 15c. The condensate from the heat exchangers 13 and condenser 13b flows into the condensate line 10.

Sulfide, preferably in the form of sodium sulfide or sodium hydrosulfide, may be added to the dissolving water in line 10 or to the dissolved crude trona before it enters the clarifier 2, to precipitate any iron dissolved from the crude trona and to prevent further precipitation of iron as the trona solution is cooled from 90° to 60° C. and concentrated in the crystallizers 4. The sulfide should be present in an amount sufficient to maintain the sulfide concentration in the solution high enough to precipitate any iron dissolved from the crude trona in dissolvers 1, which is precipitable at the temperature of the hot solution in the clarifier and prevent precipitation of iron with the crystals in the crystallizers in which the temperature is reduced to about 60° or below to precipitate the sodium sesquicarbonate crystals. The preferred amount of sulfide in the solution is between 200 to 400 parts per million based on the weight of the solution, but it may vary between 100 and 1000 parts per million. In the crystallizers the sulfide is vaporized from the solution as the temperature is reduced and the water removed from the trona solution. As the sulfide is removed from the trona solution, the solubility of the iron in the trona solution is increased and therefore the iron remains dissolved in the concentrated mother liquor and does not precipitate from solution and contaminate the sodium sesquicarbonate crystals.

The described process also has the advantage of recrystallizing the sodium sesquicarbonate to produce exceptionally pure crystals. The soluble impurities tend to concentrate in the mother liquor thereby producing a purer sodium sesquicarbonate with respect to the soluble impurities than the crude trona being fed into the process. Since some of the mother liquor adheres to the crystals, it is desirable to control the buildup of the soluble impurities in the mother liquor. This is easily accomplished by purging some of the mother liquor from the recycle line 12 after crystallization and before recycling to the crystallizers.

The loss of sodium carbonate due to the mother liquor adhering to the crystals or being purged and which is essential to the crystallization step is automatically compensated for by the system. The decomposition of sodium bicarbonate within the crystallizers replenishes the amount of excess sodium carbonate values lost by the purge. If the purge is large or if the rate of decomposition of sodium bicarbonate is slow, the solution composition will shift to the left of area WZEJ in FIG. 1 whereby the decomposition rate is increased. If the shift is so great that there is crystallization outside the area WZEJ, the crystals formed are sodium bicarbonate. When this happens the decomposition rate of sodium bicarbonate is further accelerated and the sodium bicarbonate crystals will dissolve and the solution will be restored automatically to the area WZEJ. In this manner the system becomes self-correcting and only sodium sesquicarbonate crystals are obtained.

If no purge is used and/or the decomposition of the bicarbonate is too rapid, a small amount of sodium carbonate monohydrate crystals will form in the evaporator and will be removed with the sesquicarbonate crystals. This is not objectionable as sodium carbonate monohydrate crystals are of the same size magnitude as sodium sesquicarbonate crystals and when calcined will not detract from the desirable physical properties or chemical purity of the soda ash products.

In order to obtain crystals of optimum size and density a crystal growth promoter capable of modifying the crystallization habits and of increasing the size of the sesquicarbonate crystals may be introduced into the filtered trona solution at the entrance of the crystallizers. The preferred crystallization additives are (1) alkyl benzene sulfonates containing at least 8 alkyl carbon atoms, (2) alkyl naphthenate sulfonates containing at least 4 alkyl carbon atoms, (3) primary alkyl alcohol sulfates containing at least 10 carbon atoms, and (4) N-substituted taurines of the formula $R'R''N—CH_2CH_2SO_3M$ wherein R' is a hydrocarbon radical, R'' is the acyl radical of a higher fatty acid, and M is an alkali metal, although other anionic crystallization promoters may be used. The use of such crystallization growth promoters is described in more detail in Patent No. 2,954,282.

For crystallizing sodium sesquicarbonate the additive is preferably used in amounts of about 5 to about 100 parts per million and its use increases the size of soda ash crystals produced from the sodium sesquicarbonate in plant practice from an average of less than 40% plus 100 mesh to an average of over 80% plus 100 mesh.

FIG. 4 illustrates an application of this invention to water solutions of trona produced by dissolving the trona underground and bringing the solution to the surface for processing into soda ash by the processes herein described. In this drawing numerals 20 to 40 have been used to indicate the principal flow lines of material through solution.

the process, and letters A to Q to explain the material balance hereinafter given. According to this embodiment, soft water heated preferably to a temperature of about 130° C. is pumped through line 20, down well 21, and through the trona bed 22 to well 23 where it exits from said well as a solution saturated at about 90° C. The wells 21 and 23 may be connected at the base of the trona bed by hydraulic fracturing as described in the Pullen Patent No. 2,847,202 or in any other desired manner, or a plurality of individual wells with water inlet and outlet connections may be used.

The solution of trona produced in this way is relatively free from insolubles if the rate of flow through the formation is kept low enough that the insoluble materials in the trona are largely deposited underground. If filtration of the solution is necessary, filters may be used. The clarified trona solution flows through line 24 to the crystallizers indicated diagrammatically at 40. Recycle filtrate or mother liquor is added to the water solution of trona in line 24 through the line 25 to form the feed 26 to the crystallizers. In the crystallizer water is indicated as being lost through line 27 and $CO_2$ is indicated as being lost through line 28. The crystal slurry flows through the line 29 to a centrifuge or filter station 30. The filter cake is washed with water from the line 31 and the combined filtrate and wash water flows through the line 32 to provide the recycle stream 25. A purge to keep down impurities is indicated at 33. The washed filter cake consisting of sodium sesquicarbonate crystals is indicated as going through the line 34 to the calciner 35 to produce soda ash.

In the following examples several preferred embodiments are described to illustrate the invention. However, it should be understood that the invention is not intended to be limited to the specific embodiments.

EXAMPLE I

Following the process as described in accordance with FIG. 3, 80.0 tons of substantially salt-free crude trona, equivalent to 71.2 tons of pure trona, were dissolved in 147.7 tons of water at a temperature of 90° to 95° C. The crude trona solution was run into the clarifier 2 (FIG. 3) wherein the insoluble materials were settled out. Then the trona solution was filtered to remove any remaining insolubles. No allowance was made for the trona and water which were removed with the insolubles. The clarified and filtered initial trona solution is represented by the point A in FIG. 1. The 218.9 tons of trona solution was then mixed with 221.3 tons of recycled mother liquor from the final crystallization stage. The mother liquor contained 21% sodium carbonate and 8% sodium bicarbonate and was represented by point C in FIG. 1. When the two solutions were mixed in these proportions, the resultant solution contained 18.15% sodium carbonate and 10.05% sodium bicarbonate and was represented by the point B in FIG. 1. This was well within the area WZEJ wherein sodium sesquicarbonate will be crystallized. The resultant solution was fed into a crystalizer and 143.4 tons of water were evaporated at 90° C., leaving 68.6 tons of sodium sesquicarbonate crystals and 228.7 tons of mother liquor. The crystals were separated by means of a centrifuge from the resulting slurry having a density of 23% crystals, and were dried and calcined at temperatures of 150° C. to 550° C. in steam tube or direct fired rotary calciner or any other type of calcining equipment. The soda ash crystals were large in size and of a high purity. The 143.4 tons of water evaporated were condensed and recycled to the dissolver and makeup water was added as described to compensate for the loss of water during the evaporation. The mother liquor was recycled and mixed with more trona The following Table I is a summary of the said process:

flowed through the well system in order to produce 50 tons per day of finished soda ash. The well exit solu-

Table I
MINIMUM CO₂ LOSS TO CRYSTALLIZE SESQUICARBONATE FROM SALT FREE SOLUTION—MATERIAL BALANCE FOR 50 T.P.D. SODA ASH

|  | Composition, percent | | | Flow, g.p.m. | Tons Per Day | | | |
| --- | --- | --- | --- | --- | --- | --- | --- | --- |
|  | $Na_2CO_3$ | $NaHCO_3$ | $H_2O$ |  | $Na_2CO_3$ | $NaHCO_3$ | $H_2O$ | Total |
| Water Added to Dissolver |  |  | 100.00 | 24.6 |  |  | 147.7 | 147.7 |
| Trona Added to Dissolver | 46.89 | 37.17 | 15.94 |  | 33.4 | 26.5 | 11.3 | 71.2 |
| Feed Liquor from Dissolver | 15.2 | 12.1 | 72.7 | 30.4 | 33.4 | 26.5 | 159.0 | 218.9 |
| Recycle Mother Liquor Added to Feed Liquor | 21.0 | 8.0 | 71.0 | 30.7 | 46.5 | 17.7 | 157.1 | 221.3 |
| Crystallizer Feed | 18.15 | 10.05 | 71.8 | 61.1 | 79.9 | 44.2 | 316.1 | 440.2 |
| Water Evaporated |  |  | 100.0 | 23.9 |  |  | 143.4 | 143.4 |
| Change due to CO₂ Evolution |  |  |  |  | +0.3 | −0.5 | +0.1 | −0.12 |
| Sesquicarbonate Crystals in Crystal Slurry | 46.89 | 37.17 | 15.94 |  | 32.2 | 25.5 | 10.9 | 68.6 |
| Mother Liquor in Crystal Slurry | 21.0 | 8.0 | 71.0 | 31.6 | 48.0 | 18.2 | 161.9 | 228.7 |
| Mother Liquor on Crystals |  |  |  | 0.9 | 1.5 | .5 | 4.8 | 6.8 |
| Recycle Mother Liquor |  |  |  | 30.7 | 46.5 | 17.7 | 157.1 | 221.3 |
| Wet Crystals | 44.7 | 34.5 | 20.8 |  | 33.7 | 26.0 | 15.7 | 75.4 |
| Calcined Crystals | 100.0 |  |  |  | 50.0 |  |  | 50.0 |

The carbon dioxide loss indicates the minimum carbon dioxide loss required to keep the mixed evaporation feed in the sesquicarbonate crystallization area of the phase diagram of FIG. 1. If the carbon dioxide loss was less than this minimum, some bicarbonate or tri-bicarbonate would be crystallized along with the sodium sesquicarbonate.

EXAMPLE II

Again in accordance with the process described in FIG. 3, salt-free crude trona was treated to produce 50 tons of calcined soda ash per day. The material balance throughout the system is set forth in Table II.

Table II
MINIMUM CO₂ LOSS TO CRYSTALLIZE SESQUICARBONATE FROM SALT FREE SOLUTION—MATERIAL BALANCE FOR 50 T.P.D. SODA ASH

|  | Composition, percent | | | Flow, g.p.m. | Tons Per Day | | | |
| --- | --- | --- | --- | --- | --- | --- | --- | --- |
|  | $Na_2CO_3$ | $NaHCO_3$ | $H_2O$ |  | $Na_2CO_3$ | $NaHCO_3$ | $H_2O$ | Total |
| Water Added to Dissolver |  |  | 100.0 | 24.7 |  |  | 148.4 | 148.4 |
| Trona Added to Dissolver | 46.89 | 37.17 | 15.94 |  | 33.5 | 26.6 | 11.4 | 71.5 |
| Feed Liquor From Dissolver | 15.2 | 12.1 | 72.7 | 30.6 | 33.5 | 26.6 | 159.8 | 219.9 |
| Recycle Mother Liquor | 29.2 | 3.4 | 67.4 | 30.7 | 64.5 | 7.5 | 148.9 | 220.9 |
| Crystallizer Feed | 22.20 | 7.74 | 70.06 | 61.3 | 98.0 | 34.1 | 308.7 | 440.8 |
| Water Evaporated |  |  | 100.0 | 23.7 |  |  | 144.5 | 144.5 |
| Change Due to CO₂ Evolution |  |  |  |  | +0.6 | −1.1 | +0.2 | −0.26 |
| Sesquicarbonate Crystals in Crystal Slurry | 46.89 | 37.17 | 15.94 |  | 32.0 | 25.4 | 10.9 | 6.83 |
| Mother Liquor in Crystal Slurry | 29.2 | 3.4 | 67.4 | 31.6 | 66.6 | 7.7 | 153.4 | 227.7 |
| Mother Liquor on Crystals |  |  |  | 0.9 | 2.1 | .2 | 4.5 | 6.8 |
| Recycle Mother Liquor |  |  |  | 30.7 | 64.5 | 7.5 | 148.9 | 220.9 |
| Wet Crystals | 45.4 | 34.1 | 20.5 |  | 34.1 | 25.6 | 15.4 | 75.1 |
| Calcined Crystals | 100.0 |  |  |  | 50.0 |  |  | 50.0 |

The mother liquor coming from the evaporators is represented on FIG. 1 by point E and when mixed with the feed liquor from the dissolvers, the mixture is represented by point D in FIG. 1. The carbon dioxide loss is the maximum carbon dioxide loss which can be tolerated without crystallizing some sodium carbonate monohydrate along with the sodium sesquicarbonate. However, if some provision is made for carbon dioxide readsorption or for a purge to remove excess carbonate, higher carbon dioxide losses can be tolerated in the evaporators.

EXAMPLE III

In accordance with the solution mining process illustrated in FIG. 4, 170 tons of water per day must be tion must be saturated at 90° C. and its composition is indicated by point F in FIG. 2. The 170 tons of water will dissolve 78 tons of crude trona per day and 2.34 tons of sodium chloride as about 3 tons of sodium chloride is dissolved underground for every 100 tons of trona. The 250.34 tons of crude trona solution are mixed with 217.11 tons of mother liquor from the single stage crystallizer 40. The mother liquor contained 18.7% sodium carbonate, 2.2% sodium bicarbonate and 9.8% sodium chloride. When the two solutions are so mixed, a crystallizer feed of 467.45 tons is produced containing 16.5% sodium carbonate, 7.2% sodium bicarbonate and 5.1% sodium chloride and is indicated by point G in FIG. 2. There is a 30% slurry of sodium sesquicarbonate crystals in the mother liquor leaving the crystallizer, and the slurry composition is indicated by point I in FIG. 2. Evaporation and crystallization along the line G—H evaporates 159.83 tons of water and produces 71.10 tons of sodium sesquicarbonate crystals and 236.9 tons of mother liquor. The crystals were separated from the mother liquor by means of a centrifuge, dried and calcined at temperatures from 150° C. to 550° C. as in Example I. The mother liquor was recycled and mixed with more trona solution after purging. The material balance through the lines of A to Q of FIG. 4 is summarized in Table III.

Table III
MATERIAL BALANCE FOR SESQUICARBONATE CRYSTALLIZATION FROM SALT CONTAINING SOLUTIONS

| Ref. | Composition, Percent | | | | Flow, g.p.m. | Tons Per Day | | | | |
|---|---|---|---|---|---|---|---|---|---|---|
| | $Na_2CO_3$ | $NaHCO_3$ | NaCl | $H_2O$ | | $Na_2CO_3$ | $NaHCO_3$ | NaCl | $H_2O$ | Total |
| A. Water to Wells | | | | 100.0 | 28.3 | | | | 170.00 | 170.00 |
| B. Trona Dissolved | 46.89 | 37.17 | 0.00 | 15.94 | | 36.59 | 28.98 | | 12.43 | 78.00 |
| C. NaCl Dissolved | | | 100.0 | | | | | 2.34 | | 2.34 |
| D. Well Exit Solution | 14.6 | 11.6 | 0.94 | 72.9 | 35.0 | 36.59 | 28.98 | 2.34 | 182.43 | 250.34 |
| E. Recycled Mother Liquor | 18.7 | 2.2 | 9.8 | 69.4 | 30.1 | 40.76 | 4.70 | 21.35 | 151.30 | 217.11 |
| F. Crystallizer Feed | 16.5 | 7.2 | 5.1 | 71.2 | 65.1 | 77.35 | 33.68 | 23.69 | 233.73 | 467.45 |
| G. Water Evaporated | | | | 100.0 | 26.6 | | | | 159.83 | 159.83 |
| H. Change due to $CO_2$ Evolution | | | | | | +1.23 | −1.95 | | +.21 | −0.51 |
| I. Sesquicarbonate Crystals in Crystal Slurry | 46.9 | 37.2 | 0.0 | 15.9 | | 33.34 | 26.42 | | 11.34 | 71.10 |
| J. Mother Liquor in Crystal Slurry | 19.1 | 2.2 | 10.0 | 68.7 | | 45.23 | 5.21 | 23.69 | 162.77 | 236.90 |
| K. Composition of 30% Crystal Slurry | 25.5 | 10.3 | 7.7 | 56.5 | | 78.57 | 31.63 | 23.69 | 174.11 | 308.00 |
| L. Wash Water on Filter | | | 0.6 | 26.7 | 2.1 | | | 0.50 | 12.55 | 12.55 |
| M. Washed Crystals | 41.0 | 31.7 | | | | 34.30 | 26.53 | | 22.32 | 83.65 |
| N. Mother Liquor | 18.7 | 2.2 | 9.8 | 69.4 | 32.7 | 44.27 | 5.10 | 23.19 | 164.34 | 236.90 |
| O. Mother Liquor Purge | | | | | 2.6 | 3.51 | 0.40 | 1.84 | 13.04 | 18.79 |
| P. Recyle Mother Liquor | | | | | 30.1 | 40.76 | 4.70 | 21.35 | 151.30 | 217.11 |
| Q. Calcined Crystals | 99.03 | | 0.97 | | | 51.05 | | 0.50 | | 51.55 |

While we have described some modifications of the process, other modifications may be made in the principal process as well as treatment of purge to recover soda values, continuous or batch operations, and other changes may be used, without departing from the spirit of the invention or scope thereof, and it is to be understood that the invention is limited only as defined in the appended claims.

We claim:
1. A process for producing soda ash from natural trona which comprises continuously dissolving the trona in heated water, removing the insoluble matter, adding a substantially crystal free mother liquor to the solution containing sufficient sodium carbonate to bring the solution into the range where sodium sesquicarbonate will precipitate therefrom, evaporating water from the solution to produce a slurry of sodium sesquicarbonate in a mother liquor, recovering the sesquicarbonate crystals from the mother liquor, calcining the sesquicarbonate crystals to soda ash, and recycling the substantially crystal free mother liquor to the insoluble free, water solution of trona for the production of sesquicarbonate crystals therefrom.

2. The process of claim 1 in which the amount of water evaporated substantially equals the amount of water used to dissolve the trona.

3. The process of claim 1 in which the trona is dry mined, crushed and dissolved above ground.

4. The process of claim 1 in which the trona is dissolved in situ and the water solution of trona is brought above ground for processing.

5. The process of claim 1 in which a crystallization promoter of the group consisting of (1) alkyl benzene sulfonates containing at least 8 alkyl carbon atoms, (2) alkyl naphthenate sulfonates containing at least 4 alkyl carbon atoms, (3) primary alkyl alcohol sulfates containing at least 10 carbon atoms, and (4) N-substituted taurines of the formula R'R''N—$CH_2CH_3SO_3M$, wherein R' is a hydrocarbon radical, R'' is the acyl radical of a higher fatty acid, and M is an alkali metal, is added to the solution going through the evaporators.

6. The process of claim in which a soluble sulfide is maintained in the plant liquors sufficient to substantially prevent precipitation of iron in the sodium sesquicarbonate crystals.

7. A process for producing soda ash from trona which comprises dissolving trona in heated water to provide a solution containing between 13 and 18 lbs. $Na_2CO_3$ and between 10 and 14 lbs. $NaHCO_3$ per 100 lbs. of solution, removing insolubles from the solution, adding a substantially crystal free mother liquor containing $Na_2CO_3$ and $NaHCO_3$ in sufficient amounts to produce a solution containing between 17 and 24 lbs. $Na_2CO_3$ and between 5 and 10 lbs. $NaHCO_3$ per 100 lbs. of solution from which solution upon evaporation only sodium sesquicarbonate crystals will precipitate, evaporating the solution to produce a slurry of sodium sesquicarbonate crystals in a mother liquor and to decompose sufficient sodium bicarbonate to compensate for lost sodium carbonate values, separating the sesquicarbonate crystals from the mother liquor, calcining the sesquicarbonate crystals to soda ash, and recycling the substantially crystal free mother liquor to the insoluble free water solution of trona.

8. A process for producing soda ash from natural trona which comprises dissolving the trona in water, removing the insoluble matter, evaporating the solution in the presence of a substantially crystal free aqueous solution containing substantially more sodium carbonate than sodium bicarbonate, thereby obtaining a slurry of sodium sesquicarbonate crystals in a mother liquor, recovering the sesquicarbonate crystals from the mother liquor and calcining same to produce soda ash, and recycling the substantially crystal free mother liquor back to the evaporative step.

9. A process for producing soda ash from natural trona which comprises producing a water solution of trona which is saturated at 80° to 110° C., removing insolubles from said solution, adding a minor quantity of substantially crystal free sodium carbonate solution and evaporating the mixture until all the dissolved trona has been recovered as sodium sesquicarbonate crystals in a slurry with a mother liquor portion being the substantially sodium carbonate solution, separating the crystals from the mother liquor, calcining the sodium sesquicarbonate crystals into soda ash and recycling the substantially crystal free sodium carbonate mother liquor to the evaporating process.

10. The process of claim 8 in which a purge is maintained to keep the impurity level low in the liquor in the evaporative step.

11. The process of claim 8 in which the dissolving step occurs by contacting the trona in place with hot water.

References Cited in the file of this patent

UNITED STATES PATENTS

| 2,798,790 | Pike | July 9, 1957 |
| 2,954,282 | Bauer | Sept. 27, 1960 |

FOREIGN PATENTS

| 206,010 | Australia | Dec. 30, 1955 |

OTHER REFERENCES

Chemical Engineering, March 1954, pp. 342–345, TNI. M45.

UNITED STATES PATENT OFFICE
CERTIFICATE OF CORRECTION

Patent No. 3,119,655                      January 28, 1964

William R. Frint et al.

It is hereby certified that error appears in the above numbered patent requiring correction and that the said Letters Patent should read as corrected below.

Column 6, line 2, strike out "solution." and insert the same after "trona" in line 1, column 7; columns 7 and 8, Table II, in the title, line 1 thereof, for "MINIMUM" read MAXIMUM --; same Table II, ninth column, line 8 thereof, for "6.83" read -- 68.3 --; column 9, line 65, after "claim" insert --1 --.

Signed and sealed this 8th day of September 1964.

(SEAL)
Attest:

ERNEST W. SWIDER
Attesting Officer

EDWARD J. BRENNER
Commissioner of Patents